(12) United States Patent
Lee et al.

(10) Patent No.: US 10,705,360 B2
(45) Date of Patent: Jul. 7, 2020

(54) METHOD FOR MANUFACTURING CURVED DISPLAY PANEL, AND CURVED DISPLAY PANEL MANUFACTURED BY SAME MANUFACTURING METHOD

(71) Applicant: TOVIS CO., LTD., Incheon (KR)

(72) Inventors: Kyung Ha Lee, Changwon-si (KR); Ryongmin Park, Goyang-si (KR); In Suk Lee, Seoul (KR)

(73) Assignee: TOVIS CO., LTD., Incheon (KR)

( * ) Notice: Subject to any disclaimer, the term of this patent is extended or adjusted under 35 U.S.C. 154(b) by 0 days.

(21) Appl. No.: 16/098,127

(22) PCT Filed: Jun. 20, 2017

(86) PCT No.: PCT/KR2017/006426
§ 371 (c)(1),
(2) Date: Oct. 31, 2018

(87) PCT Pub. No.: WO2017/222263
PCT Pub. Date: Dec. 28, 2017

(65) Prior Publication Data
US 2019/0137800 A1 May 9, 2019

(30) Foreign Application Priority Data
Jun. 21, 2016 (KR) .......................... 10-2016-0077499

(51) Int. Cl.
*G02F 1/1333* (2006.01)
(52) U.S. Cl.
CPC ...... *G02F 1/1333* (2013.01); *G02F 1/133305* (2013.01)

(58) Field of Classification Search
CPC .......................... G02F 1/1333; G02F 1/133305
See application file for complete search history.

(56) References Cited

U.S. PATENT DOCUMENTS

| 2005/0046783 A1 | 3/2005 | Kawata et al. |
| 2012/0168058 A1* | 7/2012 | Kim .................. B29D 11/0073 |
| | | 156/101 |

(Continued)

FOREIGN PATENT DOCUMENTS

| JP | 2005-077945 A | 3/2005 |
| JP | 2009-047875 A | 3/2009 |

(Continued)

OTHER PUBLICATIONS

International Search Report for PCT/KR2017/006426 dated Sep. 15, 2017 from Korean Intellectual Property Office.

*Primary Examiner* — Thanh Nhan P Nguyen
(74) *Attorney, Agent, or Firm* — Revolution IP, PLLC (57) ABSTRACT

A method of manufacturing a curved display panel by reducing a thickness of a flat display panel comprising a first substrate and a second substrate, the method includes: polishing a portion that is to form a protrusion on an edge of at least one of the first substrate and the second substrate to a preset thickness through mechanical polishing; masking the portion that is to form the protrusion, polished to the preset thickness in the polishing, using a masking member so as to prevent the portion from being etched by an etchant; and etching the display panel to a preset thickness by the etchant so as to be thinner than the portion masked by the masking member to make the protrusion protrude therefrom.

9 Claims, 10 Drawing Sheets

(56) References Cited

U.S. PATENT DOCUMENTS

2013/0023075 A1    1/2013  Lee et al.
2015/0301390 A1   10/2015  Kim
2019/0113795 A1*   4/2019  Lee ..................... G02F 1/1333

FOREIGN PATENT DOCUMENTS

KR    10-2013-0011498 A    1/2013
KR    10-2014-0053774 A    5/2014
KR    10-2015-0083448 A    7/2015
KR       10-1624717 B1    5/2016

* cited by examiner

METHOD FOR MANUFACTURING CURVED DISPLAY PANEL, AND CURVED DISPLAY PANEL MANUFACTURED BY SAME MANUFACTURING METHOD

TECHNICAL FIELD

The present invention relates to a method of manufacturing a curved display panel to enable the manufacture of the curved display panel by reducing the thickness of a previously manufactured display panel, and a curved display panel manufactured by the manufacturing method.

BACKGROUND ART

In general, a display device is a device that displays an image. In recent years, a curved display device, which is bent to have a curved shape in order for a viewer to feel a greater sense of immersion in the image displayed on the screen, has been disclosed.

Such a curved display device is manufactured by attaching a curved-shape-holding member, which is capable of maintaining a curved shape, to a display panel, or by introducing a display panel into a curved case, in order to keep the display panel bent in a curved shape.

Meanwhile, since a general display panel, used for the manufacture of a curved display device, may be easily broken when it is bent, it is necessary for the display panel to be manufactured to a minimum thickness.

A method of manufacturing a display panel for the manufacture of a curved display device is disclosed in Korean Patent Laid-Open Publication No. 10-2015-0083448 entitled "METHOD OF MANUFACTURING CURVED DISPLAY".

In the disclosed method for the manufacture of a curved display device, both surfaces of a display panel are etched using an etchant so that the display panel has a small thickness, whereby a curved display that may be easily bent may be manufactured.

Meanwhile, a protrusion, which is not etched, is formed on an edge portion of the etched display panel in order to increase the rigidity of the display panel or to protect a drive circuit when the display panel is bent to have a curved shape. In the case in which the protrusion is initially formed and not etched, however, it is difficult to manufacture a slim curved display panel due to the thickness of the protrusion.

In order to address this problem, in the related art, when etching is performed in order to reduce the thickness of a display panel, the entire display panel including a portion that is to form a protrusion is primarily etched using an etchant so that the thickness thereof is reduced, and thereafter, the display panel excluding the portion that is to form the protrusion is secondarily etched using the etchant so that the thickness thereof is reduced. This may achieve a reduction in the height of the protrusion.

However, the etching method of the related art may increase the defect rate of the manufactured curved display panel due to the penetration of the etchant since the thickness of the display panel is reduced by performing etching twice in order to achieve a reduction in the thickness of the protrusion.

In addition, since only the portion that is to form the protrusion is etched by the etchant during etching, a sealing member disposed adjacent to the protrusion is not changed in thickness, which causes inconvenience in the manufacture of the display panel since it is necessary to reinstall a sealing member having a thickness suited to the reduced thickness of the protrusion.

In addition, although a masking member is provided to prevent the protrusion from being etched, the protrusion may be excessively etched due to the infiltration of the etchant since the masking member has a small thickness, which may cause damage to the protrusion during bending of the display panel.

DISCLOSURE

Technical Problem

Therefore, the present invention has been made in view of the above problems, and it is an object of the present invention to provide a method of manufacturing a curved display panel, which is capable of reducing the defect rate of the display panel due to the penetration of an etchant by maximally preventing the display panel from being exposed to the etchant when the etchant is used to reduce the thickness of a protrusion, which is capable of making it unnecessary to reinstall a sealing member, thus eliminating any inconvenience in manufacture, and which is capable of preventing excessive etching of the protrusion and thus, preventing damage to the protrusion, and a curved display panel manufactured by the manufacturing method.

Technical Solution

In accordance with an aspect of the present invention, the above and other objects can be accomplished by the provision of a method of manufacturing a curved display panel to enable manufacture of the curved display panel by reducing a thickness of a flat display panel comprising a first substrate and a second substrate, the method including polishing a portion that is to form a protrusion on an edge of at least one of the first substrate and the second substrate to a preset thickness through mechanical polishing, masking the portion that is to form the protrusion, polished to the preset thickness in the polishing, using a masking member so as to prevent the portion from being etched by an etchant, and etching the display panel to a preset thickness by the etchant so as to be thinner than the portion masked by the masking member to make the protrusion protrude therefrom.

The method may further include, between the masking and the etching, installing, on an outer surface of the masking member, a masking reinforcement member having a thickness such that the portion masked by the masking member is prevented from being excessively etched.

The masking may be performed in a manner such that a drive circuit board, which drives the display panel, is also surrounded by a masking member when the drive circuit board is attached to the portion masked by the masking member.

The masking member attached to the portion that is to form the protrusion may be an acid-resistant adhesive tape, and the masking member, which surrounds the drive circuit board, may be an acid-resistant film or an acid-resistant envelope.

The method may further include, before the etching, installing a seal reinforcement member on a periphery of the display panel in order to protect a seal for airtight sealing of a periphery of the first substrate and the second substrate.

The edge may be all of upper, lower, left, and right sides of the display panel, a side of the display panel to which a drive circuit board is attached, left and right sides of the side of the display panel to which the drive circuit board is attached, or a side of the display panel opposite the side to which the drive circuit board is attached.

The method may further include, after the polishing, performing surface treatment by applying a leveling agent in order to minimize roughness of a polished surface that is mechanically polished in the polishing.

The masking member may include a recess-forming portion, which makes a portion of the protrusion be exposed to the etchant, so that a division recess, which reduces rigidity of the protrusion, is formed in the portion corresponding to the recess-forming portion through etching using the etchant.

The etching may include primarily etching the display panel by the etchant to have the thickness in the polishing in order to increase uniformity of the thickness of the display panel etched by the etchant, and secondarily etching the display panel by the etchant to have a thickness smaller than a thickness of the protrusion so that the protrusion protrudes from the display panel after the primarily etching.

In accordance with another aspect of the present invention, there is provided a curved display panel manufactured by the method of manufacturing the curved display panel.

Advantageous Effects

According to the present invention, by performing etching after reducing the thickness of a portion of display panel that is to form a protrusion through mechanical polishing, it is possible to maximally prevent the display panel from being exposed to an etchant. Thereby, it is possible to prevent damage to the display panel due to the infiltration of the etchant.

In addition, it is possible to form a protrusion having any of various shapes depending on the shape of a masking member and to prevent damage to the protrusion due to excessive etching through the addition of a masking reinforcement member to the masking member.

In addition, by mechanically polishing both the portion that is to form the protrusion and a seal, it is possible to eliminate inconvenience due to the re-installation of the seal caused when the seal is exposed to the etchant.

MODE FOR INVENTION

Hereinafter, an embodiment of the present invention will be described with reference to the accompanying drawings.

First, a method of manufacturing a curved display panel 100 according to the embodiment of the present invention is technology in which a previously manufactured flat display panel 100, which is a ready-made article, is reduced in thickness through polishing and etching, and thereafter, is bent to have a desired curved shape.

The flat display panel 100 may include a first substrate 110, a second substrate 120, a liquid crystal layer 130 inserted between the first substrate 110 and the second substrate 120, a seal 140 provided along the periphery between the first substrate 110 and the second substrate 120 for airtight sealing of the liquid crystal layer 130, a drive circuit board 150 protruding from any one side of the flat display panel 100 in order to drive the flat display panel 100, and a tab 155, which connects the drive circuit board 150 to the first substrate 110 or to the second substrate 120.

In this case, when any one of the first substrate 110 and the second substrate 120 is a color filter (CF) substrate, the other one thereof may be a thin film transistor (TFT) substrate.

Figure 1:
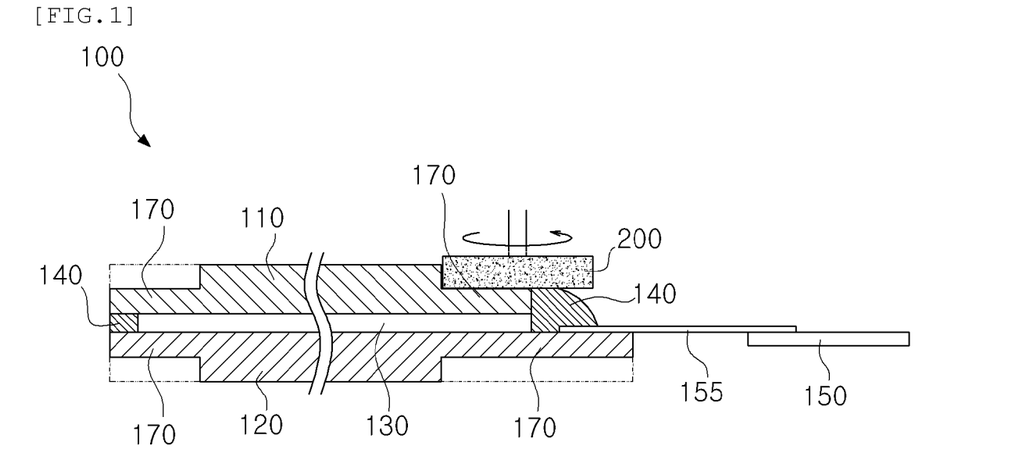
FIG. 1 is a side cross-sectional view of a display panel for explaining a polishing step in a method of manufacturing a curved display panel according to an embodiment of the present invention.

As illustrated in FIG. 1, the method of manufacturing the curved display panel 100 according to the embodiment of the present invention includes a polishing step.

The polishing step may be a step of reducing the thickness of a portion that is to form a protrusion 170, which is not etched and protrudes from the display panel 100, so as to reach a preset thickness through mechanical polishing.

Here, the protrusion 170 serves to protect the drive circuit board 150 or to prevent damage to the first substrate 110 or the second substrate 120 when the display panel 100 is bent to have a desired curved shape in the state in which the display panel 100 is reduced in thickness.

Then, the protrusion 170 may be thicker than the etched display panel 100 so as to protrude from the finally etched display panel 100, and may be formed on an edge portion of the display panel 100.

Figure 8:
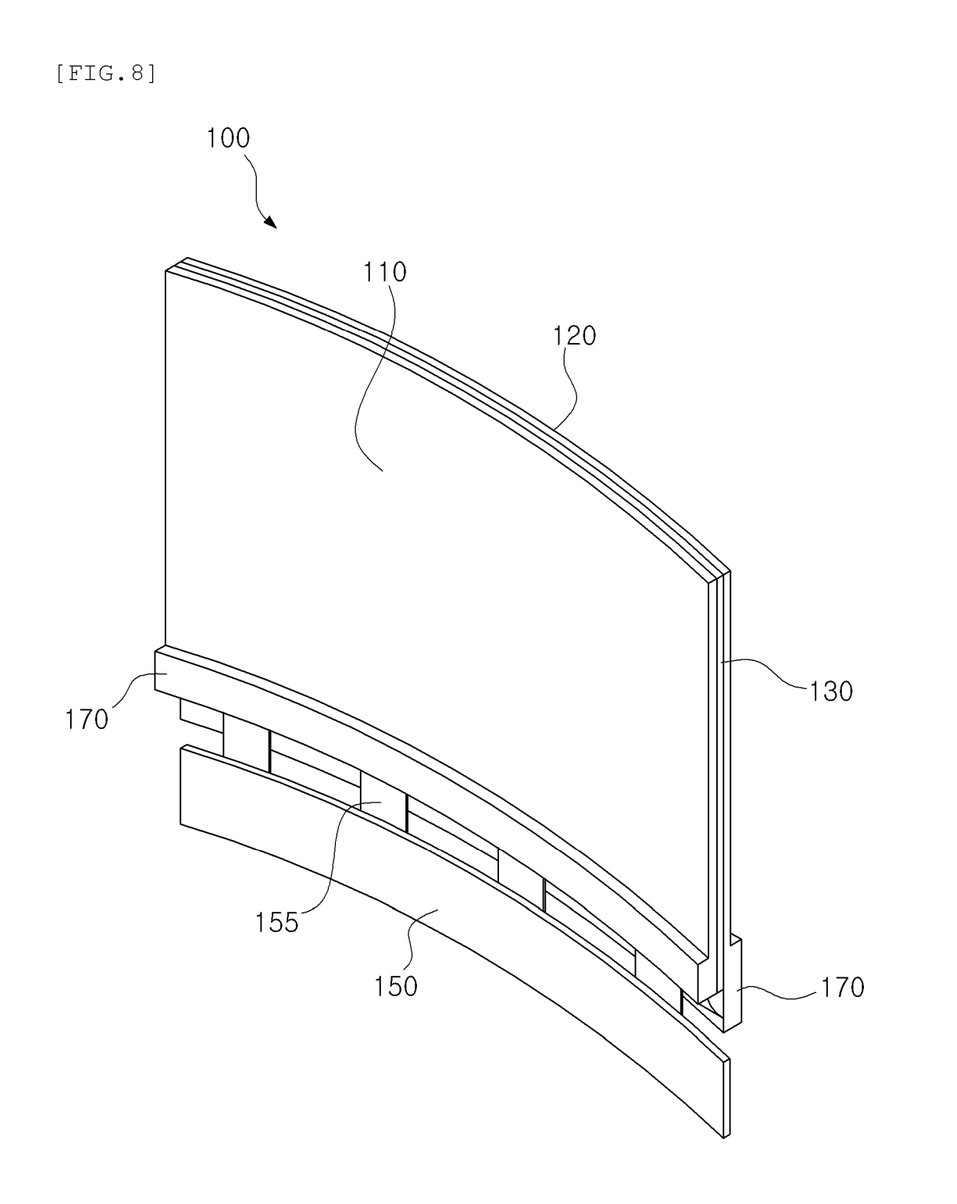
FIG. 8 is a view illustrating one exemplary curved display panel manufactured by the method of manufacturing the curved display panel according to the embodiment of the present invention.
Figure 9:
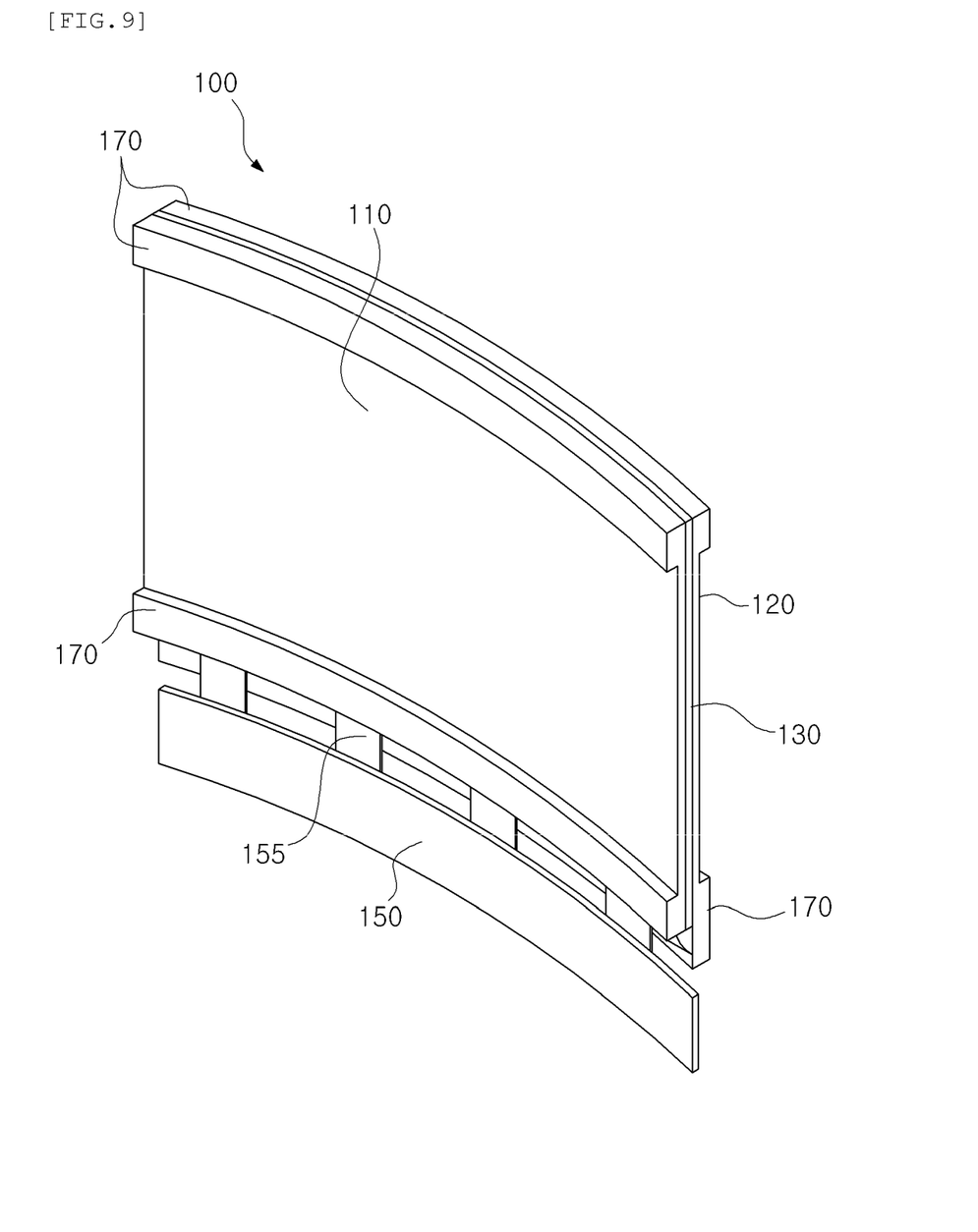
FIG. 9 is a view illustrating another exemplary curved display panel manufactured by the method of manufacturing the curved display panel according to the embodiment of the present invention.
Figure 10:
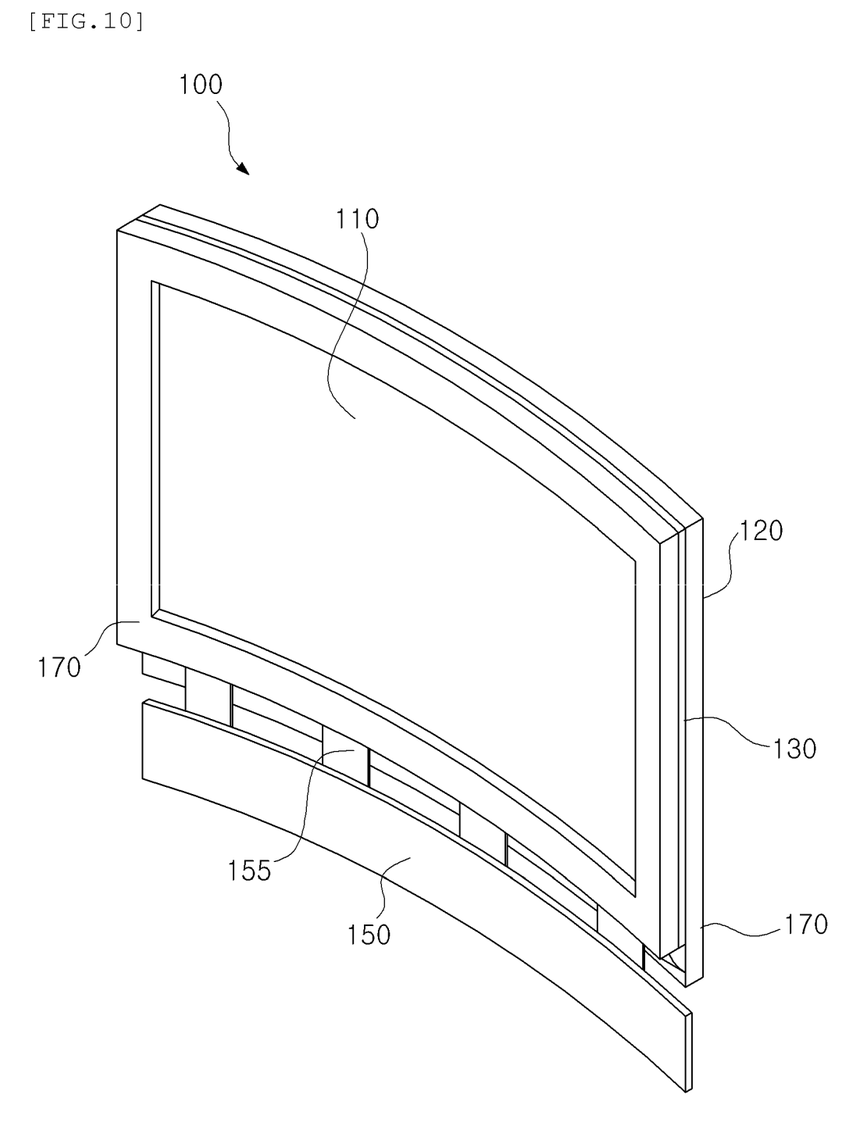
FIG. 10 is a view illustrating a further exemplary curved display panel manufactured by the method of manufacturing the curved display panel according to the embodiment of the present invention.

As illustrated in FIGS. 8 to 10, the protrusion 170 may be formed on a specific edge portion, i.e. the upper and lower sides among the upper, lower, left, and right sides (see FIG. 9), may be formed only on the lower side (see FIG. 8), or may be formed on the upper, lower, left, and right sides (see FIG. 10), i.e. on the entire edge portion of the display panel 100 (in this case, the drive circuit board 150 is located on the lower side of the display panel 100).

In addition, the protrusion 170 may be formed on the first substrate 110 and/or the second substrate 120.

For example, assuming that the first substrate 110 is a color filter substrate and that the second substrate is a thin film transistor substrate, polishing may be performed so that the thin film transistor substrate is not polished and only the color filter substrate is polished so as to form the protrusion 170, may be performed so that the color filter substrate is not polished and only the thin film transistor substrate is polished so as to form the protrusion 170, or may be performed so that both the thin film transistor substrate and the color filter substrate are polished so as to form the protrusion 170.

In the polishing step, mechanical polishing using a polishing wheel 200 may be performed by rotating the polishing wheel 200. The polishing wheel 200 may perform polishing in a manner in which a surface roughness suitable for the polishing of the display panel 100 has been selected.

Here, since the thickness of the portion that is to form the protrusion 170 is reduced in advance through mechanical polishing in the polishing step, it may be unnecessary to expose the display panel 100 to an etchant in order to form the protrusion 170, which may minimize damage to the display panel 100 due to the etchant.

Then, when polishing the portion to which the drive circuit board 150 is attached, the seal 140 provided on a portion, to which the tab 155 is attached, may also be polished to thus reach the thickness of the protrusion 170, thereby being reduced in thickness.

As described above, since the seal 140 is also mechanically polished on the portion that is to form the protrusion 170, it is possible to prevent re-installation of the seal 140, which is required when the seal 140 protrudes after etching.

Meanwhile, prior to performing the polishing step, a polarizer film, which is attached in advance to the display panel 100, may be removed.

Figure 2:
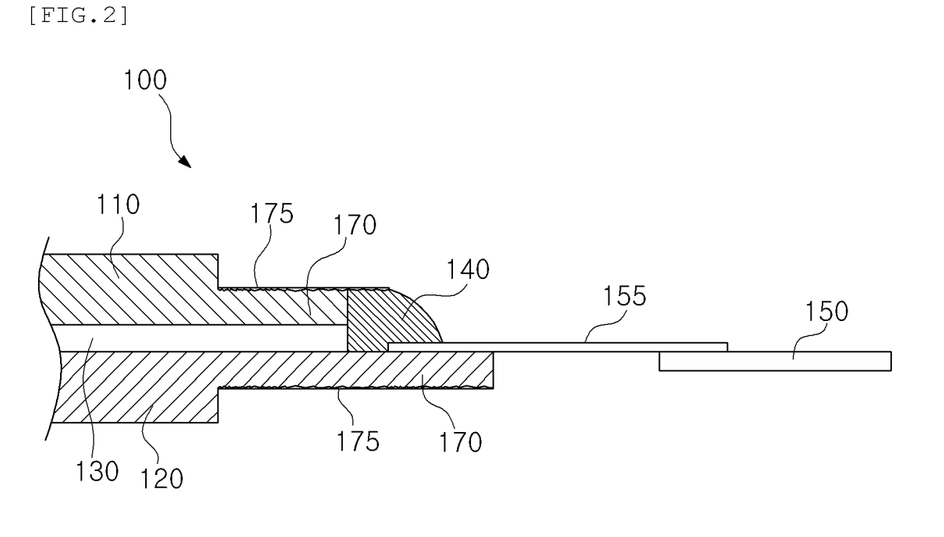
FIG. 2 is a side cross-sectional view of the display panel for explaining a surface treatment step in the method of manufacturing the curved display panel according to the embodiment of the present invention.

As illustrated in FIG. 2, the method of manufacturing the curved display panel 100 according to the embodiment of the present invention may include a surface treatment step.

The surface treatment step may be a step of applying a leveling agent 175 in order to minimize the roughness of the portion that is to form the protrusion 170 in the state in which the portion is reduced in thickness through mechanical polishing.

Here, when polishing the portion that is to form the protrusion 170 using the polishing wheel 200, the polished surface may be roughened. The resultant roughness may cause cracks due to uneven portions when the display panel 100 is bent to have a curved shape.

In order to address this problem, surface treatment may be performed on the surface of the mechanically polished portion that is to form the protrusion 170 so as to fill such uneven portions and smoothen the surface.

The leveling agent may be a resin, which may be any one of a UV resin that is cured by UV radiation, a thermosetting resin that is thermally cured, and a room-temperature curable resin that is cured at room temperature over time.

Figure 3:
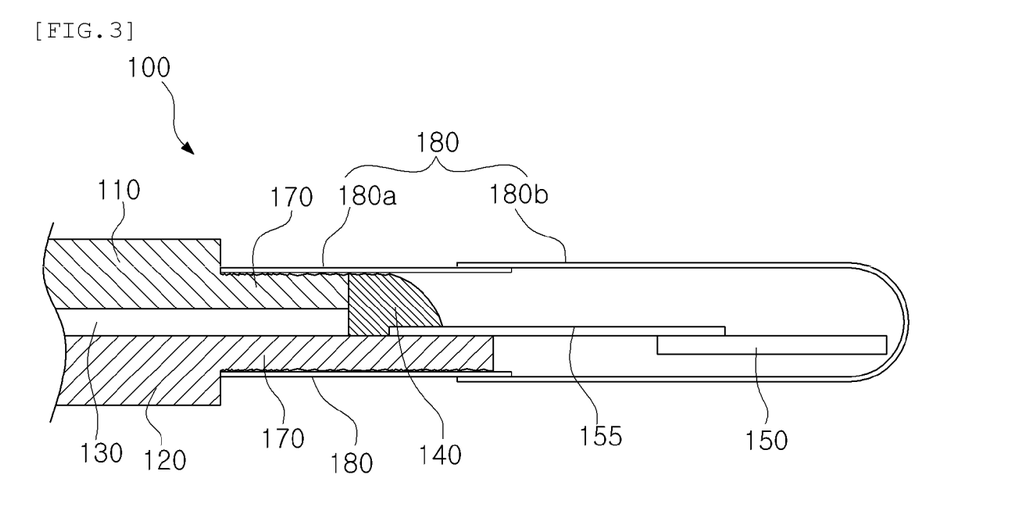
FIG. 3 is a side cross-sectional view of the display panel for explaining a masking step in the method of manufacturing the curved display panel according to the embodiment of the present invention.

As illustrated in FIG. 3, the method of manufacturing the curved display panel 100 according to the embodiment of the present invention may include a masking step.

The masking step is a step of masking the portion that is to form the protrusion 170 and is reduced to a preset thickness in the polishing step. The masking step may prevent the thickness of the protrusion 170 from being reduced in an etching step, which will be described below.

In the masking step, masking may be performed by attaching a masking member 180 having acid resistance, which is not etched by an etchant, to the portion that is to form the protrusion 170.

Here, the masking member 180 may be provided on the entire edge portion of the display panel 100 that is to form the protrusion 170. The masking member 180 may be formed as an acid-resistant adhesive tape 180a having an adhesive layer.

Meanwhile, when masking the portion, to which the drive circuit board 150 is attached, using the masking member 180, the masking member 180 may be formed so as to surround the drive circuit board 150, thereby protecting the drive circuit board 150 from an etchant.

Here, the masking member 180 for masking the drive circuit board 150 may be an acid-resistant film that is wound around and attached to the drive circuit board 150, or may be an acid-resistant envelope 180b that encloses the drive circuit board 150.

In addition, when masking both the drive circuit board 150 and the portion that is to form the protrusion 170 using the masking member 180, the acid-resistant adhesive tape 180a may be wound and attached from the portion that is to form the protrusion 170 to the periphery of the drive circuit board 150.

Here, when winding and attaching the acid-resistant adhesive tape 180a around and to the drive circuit board 150, the acid-resistant adhesive tape may be attached like roof shingles in order to allow an etchant to flow down in the state in which the drive circuit board 150 is positioned on the upper portion of the display panel 100.

The masking member 180 for masking the portion that is to form the protrusion 170 may be shaped so as to impart a certain shape to the protrusion 170.

Figure 7:
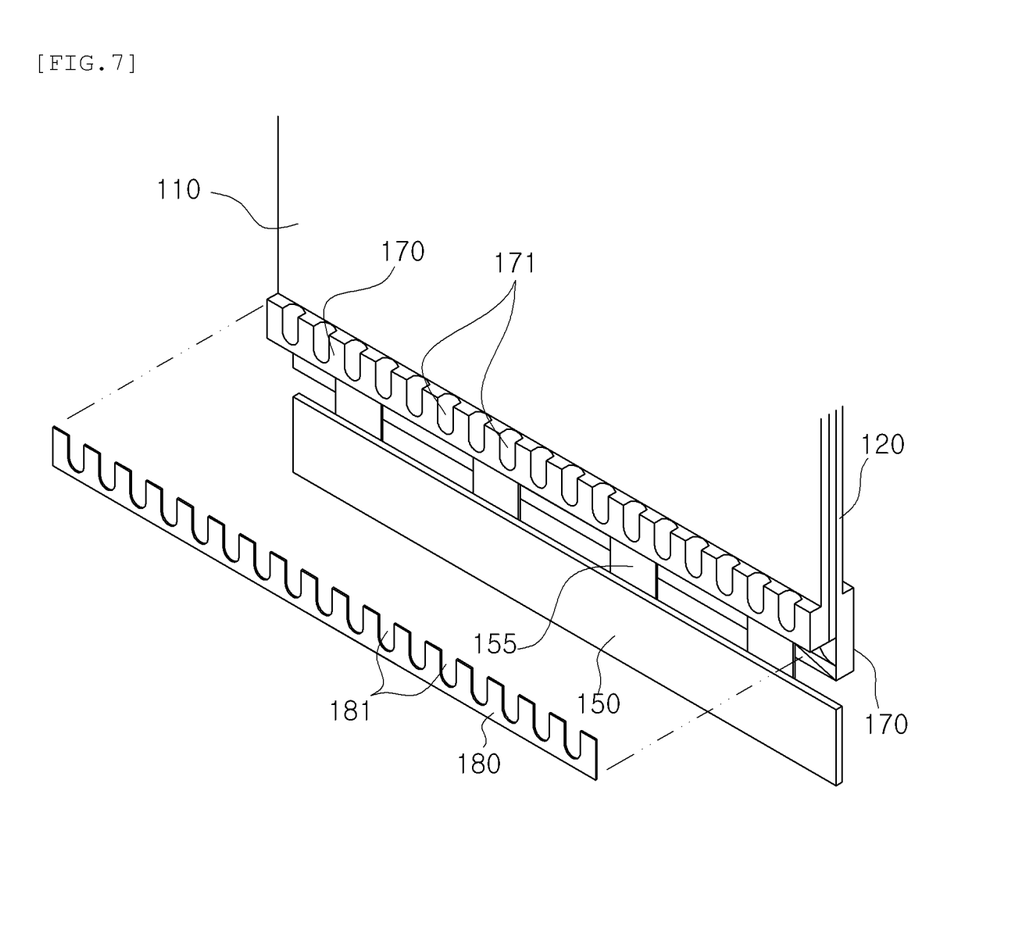
FIG. 7 is a perspective view for explaining a protrusion, formed to have a certain shape by a masking member, in the method of manufacturing the curved display panel according to the embodiment of the present invention.

As illustrated in FIG. 7, for example, the masking member 180 may be formed with recess-forming portions 181, which allow a portion of the protrusion that is to form division recesses 171 to be exposed to an etchant, so that the division recesses 171 are formed at a constant interval in the protrusion 170 through etching using the etchant in order to reduce the rigidity of the protrusion 170 when bending the display panel 100.

Figure 4:
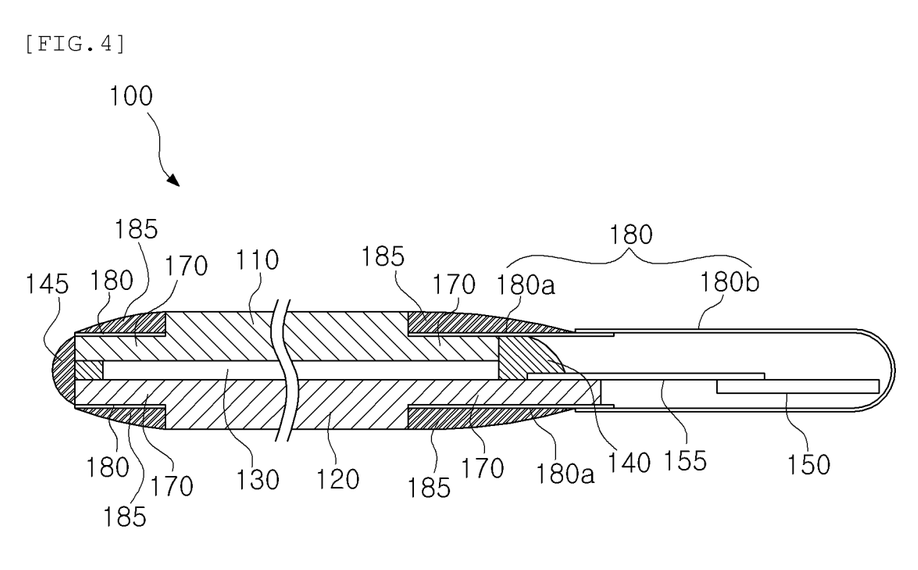
FIG. 4 is a side cross-sectional view of the display panel for explaining a seal reinforcement step and a masking reinforcement step in the method of manufacturing the curved display panel according to the embodiment of the present invention.

As illustrated in FIG. 4, the masking step may include a seal reinforcement step.

The seal reinforcement step is a step of installing a seal reinforcement member 145 on the periphery of the display panel 100 to prevent damage to the display panel 100 due to the infiltration of an etchant.

The seal reinforcement step may be performed by installing the seal reinforcement member 145 around the seal 140, which realizes airtight sealing of the liquid crystal layer 130 between the first substrate 110 and the second substrate 120. The seal reinforcement member 145 may cover the seal 140 so as to prevent an etchant from corroding the seal 140, thereby preventing the liquid crystal layer 130 from leaking from the display panel 100 and preventing the etchant from being introduced into the liquid crystal layer 130.

The seal reinforcement member 145 may be formed of a material having acid resistance in order to prevent corrosion by the etchant. The seal reinforcement member 145 may be formed of a resin so as to be applied to the periphery of the display panel 100, or may be formed of the acid-resistant adhesive tape 180a so as to be attached to the periphery of the display panel 100.

Here, the seal reinforcement member 145 may be provided to the entire periphery of the display panel 100, to which the drive circuit board 150 is attached, or may be provided to a remainder of the periphery excluding the edge portion to which the drive circuit board 150 is attached.

In addition, when the seal reinforcement member 45 is formed of a resin, the resin may be any one of a UV resin that is cured by UV radiation, a thermosetting resin that is cured by heating, and a room-temperature curable resin that is cured at room temperature over time.

As illustrated in FIG. 4, the method of manufacturing the curved display panel 100 according to the embodiment of the present invention may include a masking reinforcement step.

The masking reinforcement step is a step of installing a masking reinforcement member 185 in order to prevent the protrusion 170 from being excessively etched during etching by an etchant.

The masking reinforcement step may be performed by installing the masking reinforcement member 185 to the outer surface of the masking member 180, which is attached to the portion that is to form the protrusion 170.

Since the masking member 180 is relatively thin, when etching is performed after only the masking member 180 is attached, the etchant may penetrate the masking member 180, which may cause excessive etching of the protrusion.

When the protrusion is excessively etched, the rigidity of the protrusion 170 may be reduced, which may cause damage to the protrusion 170 when bending the display panel 100. Therefore, when the masking reinforcement member 185 applied to the outer surface of the masking member 180 increases the thickness of the masking member 180 so as to guide the downward movement of the etchant, it is possible to prevent the etchant from penetrating the masking member 180, thereby preventing the protrusion from being excessively etched.

Here, the masking reinforcement member 185 may be formed by applying a resin to the outer surface of the masking member 180, and the resin may be any one of a UV resin that is cured by UV radiation, a thermosetting resin that is cured by heating, and a room-temperature curable resin that is cured at room temperature over time.

Figure 5:
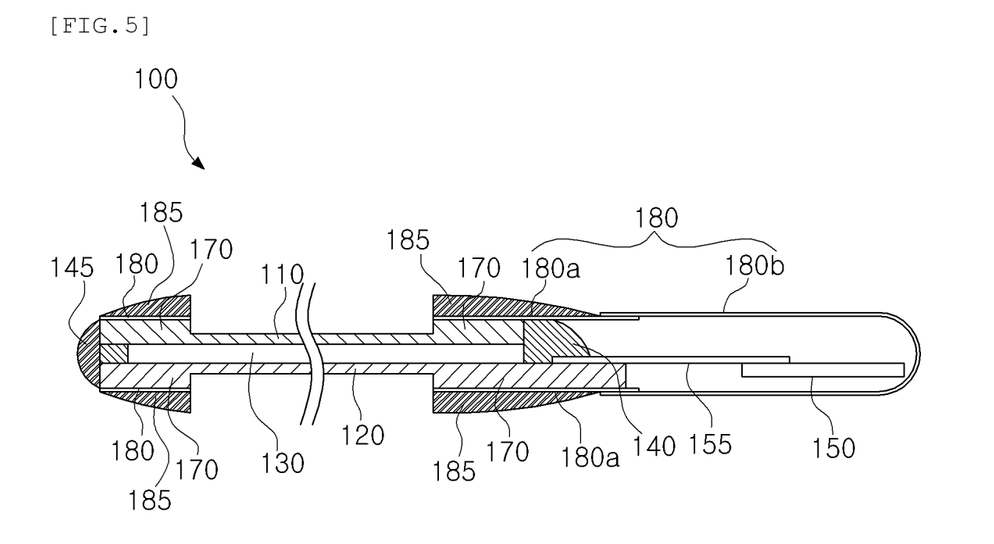
FIG. 5 is a side cross-sectional view of the display panel for explaining an etching step in the method of manufacturing the curved display panel according to the embodiment of the present invention.

As illustrated in FIG. 5, the method of manufacturing the curved display panel 100 according to the embodiment of the present invention may include an etching step.

The etching step may be a step of etching the entire display panel 100 using an etchant so that the display panel has a preset thickness.

In the etching step, the display panel 100 may be etched so as to be thinner than the protrusion 170, which is prevented from being etched by the masking member 180. The etching step may be performed in the state in which the display panel 100 is introduced into an etching device.

Here, the display panel 100 is carried into the etching device in the state in which the drive circuit board 150 is positioned on the upper portion of the display panel. The etching device may etch both surfaces or one surface of the display panel 100 by dropping an etchant from the upper portion of the display panel 100 or by spraying the etchant onto both surfaces or one surface of the display panel 100.

In the etching step, even when the protrusion 170 is formed on only one of the first substrate 110 and the second substrate 120, etching is performed using the etchant on the entire display panel so that the other substrate 110 or 120, on which no protrusion 170 is formed, is reduced in thickness along with the substrate 120 or 110 on which the protrusion 170 is formed. Alternatively, etching may be performed, excluding the substrate 120 or 110 on which no protrusion 170 is formed, so that only the substrate 110 or 120 on which the protrusion 170 is formed is reduced in thickness.

Meanwhile, the etching step may include a first etching step and a second etching step.

When etching a thick member using the etchant, the member may be etched to have an uneven thickness. Therefore, etching may be performed twice in order to enhance the uniformity of the thickness of the etched surface.

The first etching step may be performed on the display panel using the etchant so that the display panel has the same thickness as the portion that is to form the protrusion 170, which is reduced in thickness through mechanical polishing, and the second etching step may be performed in a manner such that the display panel has a thickness smaller than the thickness of the protrusion 170 so as to make the protrusion 170 protrude therefrom.

Figure 6:
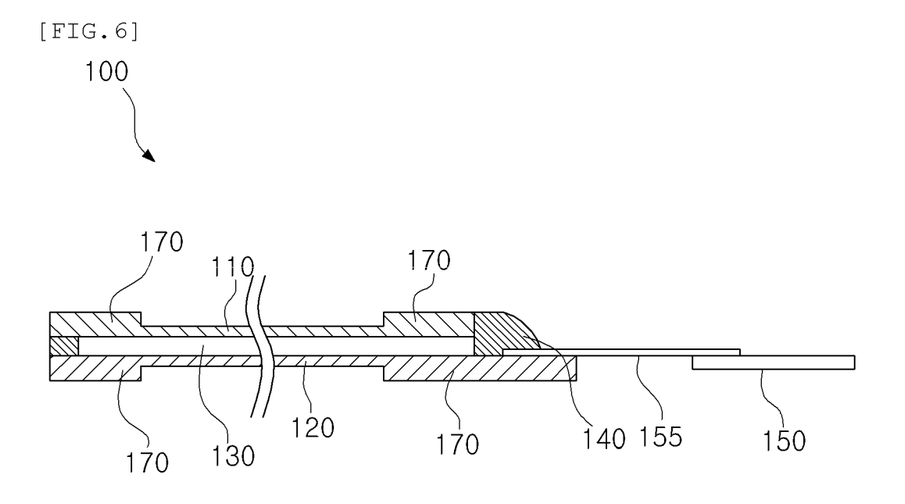
FIG. 6 is a side cross-sectional view of the display panel for explaining a removal step in the method of manufacturing the curved display panel according to the embodiment of the present invention.

As illustrated in FIG. 6, the method of manufacturing the curved display panel 100 according to the embodiment of the present invention may include a removal step.

The removal step may be a step of removing the masking members 180 attached for etching.

In the removal step, the masking member 180 that was attached to the portion that is to form the protrusion 170 in the masking step and the masking member 180 that surrounds the drive circuit board 150 may be removed together. In addition to the masking members 180, the masking reinforcement member 185 provided on the outer surface of the masking member 180 and the seal reinforcement member 145 provided on the periphery of the display panel 100 may be removed together.

In addition, when the masking member 180 and the like are removed in the removal step, final inspection is performed.

As described above, when the display panel 100 is manufactured by the method of manufacturing the curved display panel 100 according to the embodiment of the present invention, the display panel 100 is bent to have a desired curved shape so as to manufacture the display panel 100.

Then, a curved display device is manufactured by providing the display panel 100, which is bent in a curved form, into a casing that is previously manufactured, or by attaching a curved-shape holding member, which is capable of maintaining the curved shape of the display panel 100, to the display panel 100.

Accordingly, the method of manufacturing the curved display panel 100 according to the embodiment of the present invention may maximally prevent the display panel from being exposed to an etchant by mechanically polishing the portion that is to form the protrusion 170 in advance. Thereby, it is possible to prevent damage to the display panel 100 due to the etchant.

In addition, it is possible to form the protrusion 170 having any of various shapes depending on the shape of the masking member 180 and to prevent damage to the protrusion 170 due to excessive etching owing to the addition of the masking reinforcement member 185 to the masking member 180.

Although the embodiments of the present invention have been disclosed for illustrative purposes, those skilled in the art will appreciate that the scope of the present invention is not limited thereto, and various modifications, additions and substitutions are possible, without departing from the scope and spirit of the invention as disclosed in the accompanying claims.

| * Description of Reference Numerals | |
|---|---|
| 100: display panel | 110: first substrate |
| 120: second substrate | 130: liquid crystal layer |
| 140: seal | 145: seal reinforcement member |
| 150: drive circuit board | 155: tab |
| 170: protrusion | 171: division recess |
| 175: leveling agent | 180: masking member |
| 180a: acid-resistant adhesive tape | 180b: acid-resistant envelope |
| 181: recess-forming portion | 185: masking reinforcement member |
| 200: polishing wheel | |

INDUSTRIAL APPLICABILITY

The present invention is applicable to various display industrial fields in which display devices are used, such as game machines, digital signage, and monitors.

The invention claimed is:

1. A method of manufacturing a curved display panel by reducing a thickness of a flat display panel comprising a first substrate and a second substrate, the method comprising:
    polishing a portion that is to form a protrusion on an edge of at least one of the first substrate and the second substrate to a preset thickness through mechanical polishing;
    masking the portion that is to form the protrusion, polished to the preset thickness in the polishing, using a masking member so as to prevent the portion from being etched by an etchant;
    etching the display panel to a preset thickness by the etchant so as to be thinner than the portion masked by the masking member to make the protrusion protrude therefrom; and
    between the masking and the etching, installing, on an outer surface of the masking member, a masking reinforcement member having a thickness such that the portion masked by the masking member is prevented from being excessively etched.

2. The method according to claim 1, wherein the masking is performed in a manner such that a drive circuit board, which drives the display panel, is also surrounded by a masking member when the drive circuit board is attached to the portion masked by the masking member.

3. The method according to claim 2, wherein the masking member attached to the portion that is to form the protrusion is an acid-resistant adhesive tape, and
    wherein the masking member, which surrounds the drive circuit board, is an acid-resistant film or an acid-resistant envelope.

4. The method according to claim 1, further comprising, before the etching, installing a seal reinforcement member on a periphery of the display panel in order to protect a seal for airtight sealing of a periphery of the first substrate and the second substrate.

5. The method according to claim 1, wherein the edge is all of upper, lower, left, and right sides of the display panel, a side of the display panel to which a drive circuit board is attached, left and right sides of the side of the display panel to which the drive circuit board is attached, or a side of the display panel opposite the side to which the drive circuit board is attached.

6. The method according to claim 1, wherein the etching comprises:
    primarily etching the display panel by the etchant to have the thickness in the polishing in order to increase uniformity of the thickness of the display panel etched by the etchant; and
    secondarily etching the display panel by the etchant to have a thickness smaller than a thickness of the protrusion so that the protrusion protrudes from the display panel after the primarily etching.

7. A curved display panel manufactured by the method of manufacturing the curved display panel according to claim 1.

8. A method of manufacturing a curved display panel by reducing a thickness of a flat display panel comprising a first substrate and a second substrate, the method comprising:
    polishing a portion that is to form a protrusion on an edge of at least one of the first substrate and the second substrate to a preset thickness through mechanical polishing;
    masking the portion that is to form the protrusion, polished to the preset thickness in the polishing, using a masking member so as to prevent the portion from being etched by an etchant;
    etching the display panel to a preset thickness by the etchant so as to be thinner than the portion masked by the masking member to make the protrusion protrude therefrom; and
    after the polishing, performing surface treatment by applying a leveling agent in order to minimize roughness of a polished surface that is mechanically polished in the polishing.

9. A method of manufacturing a curved display panel by reducing a thickness of a flat display panel comprising a first substrate and a second substrate, the method comprising:
    polishing a portion that is to form a protrusion on an edge of at least one of the first substrate and the second substrate to a preset thickness through mechanical polishing;
    masking the portion that is to form the protrusion, polished to the preset thickness in the polishing, using a masking member so as to prevent the portion from being etched by an etchant; and
    etching the display panel to a preset thickness by the etchant so as to be thinner than the portion masked by the masking member to make the protrusion protrude therefrom,
    wherein the masking member comprises a recess-forming portion, which makes a portion of the protrusion be exposed to the etchant, so that a division recess, which reduces rigidity of the protrusion, is formed in the portion corresponding to the recess-forming portion through etching using the etchant.

* * * * *